(12) United States Patent
Franke et al.

(10) Patent No.: US 7,318,379 B2
(45) Date of Patent: Jan. 15, 2008

(54) RAIL-GUIDED TRANSPORTATION SYSTEM FOR CONTAINERS

(75) Inventors: Klaus-Peter Franke, Dettelbach (DE); Reinhard Bauer, Remlingen (DE); Annegret Laengrich, Wuerzburg (DE); Otto Weis, Oberpleichheim (DE)

(73) Assignee: Noell Mobile Systems & Cranes GmbH, Wuerzburg (DE)

( * ) Notice: Subject to any disclaimer, the term of this patent is extended or adjusted under 35 U.S.C. 154(b) by 181 days.

(21) Appl. No.: 10/987,712

(22) Filed: Nov. 12, 2004

(65) Prior Publication Data

US 2005/0103222 A1    May 19, 2005

(30) Foreign Application Priority Data

Nov. 15, 2003   (DE) ............................... 103 53 455

(51) Int. Cl.
*B60S 13/02*    (2006.01)
(52) U.S. Cl. ........................ 104/35; 246/454
(58) Field of Classification Search ................ 104/35, 104/40, 48, 130.01, 130.07; 246/454, 465
See application file for complete search history.

(56) References Cited

U.S. PATENT DOCUMENTS 5,407,316 A * 4/1995 Coatta et al. ............... 414/787
5,957,055 A * 9/1999 Bauer et al. ............... 104/35

FOREIGN PATENT DOCUMENTS

| DE | 195 03 877 | 8/1996 |
|----|------------|--------|
| DE | 196 41 043 | 4/1998 |
| DE | 198 08 555 | 11/1999 |
| EP | 0 834 459  | 4/1998 |

* cited by examiner

*Primary Examiner*—S. Joseph Morano
*Assistant Examiner*—Robert J. McCarry, Jr.
(74) *Attorney, Agent, or Firm*—Darby & Darby

(57) ABSTRACT

A linear-motor driven, rail-mounted transport system for containers and interchangeable bodies includes a network of at least two pairs of parallel disposed rails arranged at an angle with respect to each other and having a continuous flat travel surface. The pairs of rails form intersections. Outside of the intersections, guide profiles are arranged in the middle on one rail in each pair. A two-part transporter trolley has wheels that can swivel around a pivot and horizontal guide rollers. A spacing of the wheels corresponds to the spacing of the rails for the lengthwise and crosswise travel and the wheels with the guide rollers can turn in the intersection. Magnets arranged on the transporter trolley in the lengthwise and crosswise directions move the transporter trolley in the lengthwise and crosswise directions by interacting with stators of the network and a limiting element.

21 Claims, 12 Drawing Sheets

RAIL-GUIDED TRANSPORTATION SYSTEM FOR CONTAINERS

Priority is claimed to German Patent Application No. DE 105 53 455.5, filed Nov. 15, 2003, the entire disclosure of which is incorporated by reference herein.

The present invention relates to a rail-mounted transport system for containers corresponding to the features of the first patent claim as well as to a limiting element.

BACKGROUND

The rail-mounted transport system is suitable for transport containers and interchangeable bodies at transshipment facilities where the containers or interchangeable bodies have to be transported, sorted or stored and where they are to be transported without the use of additional vehicles. Such storage and sorting facilities are found in harbors where the transshipment between ships and road vehicles or rail vehicles is effectuated, but also in transshipment terminals where transshipment is effectuated between rail vehicles and road vehicles. As a rule, such storage and transshipment facilities are associated with cranes, especially container cranes, with which the containers or interchangeable bodies can be placed directly onto the rail-mounted transport system, and the containers are moved or sorted in the direction of the warehouse or the rail-mounted and road-bound transport systems is carried out.

Container transport systems or transport systems for transporting containers in interchangeable bodies are known from the current state of the art. DE 195 03 877 C2 describes a two-part pallet with electro-motor linear drives for vehicles, whereby the pallet has two parts and travels through automatic car parking garages. The vehicle is guided by guide profiles and guide elements that roll along the guide profiles, whereby swiveling support rollers travel on the center part of the guide profiles. The proposed system has the drawback that a great deal of force has to be generated at the intersections in order to steer the swiveling support rollers in a different direction. Therefore, this system is not particularly suitable for very heavy loads.

DE 196 41 043 A1 discloses a container transport system with traveling linear motors and rotating wheels consisting of a network of tracks arranged crosswise at right angles and parallel with respect to each other, which form intersections, whereby guide rails are arranged in the middle of the transport tracks outside of the intersections, and track transporter trolleys with rollers that can rotate around a rotational axis travel on said rails, whereby the spacing of the rollers corresponds to the spacing of the track, and the rollers, which are surrounded by horizontal guide rollers, can be turned in the intersections, whereby in the lengthwise and crosswise directions, the transporter trolleys have magnets that move the transporter trolleys in the lengthwise and crosswise directions by means of stators of the tracks, whereby swiveling pushing carriages, which are arranged on the transporter trolley, turn the rollers that are present. The device is especially well-suited for transporting heavy loads in containers. With this device, each two pairs of rollers is actuated by one swiveling pushing carriage. The tracks are double T-beams, whereby there are guide rails in the middle of the tracks on which the guide rollers travel and which guide the wheels, there are stators arranged on both sides of the tracks and the rollers are connected to the transporter trolley by means of a rigid rotational axle. This system has the drawback that, due to the rigid connection of the rollers, tracks that slant to one side generate high forces in the axle or pivot joint of the rollers. Moreover, if the two sides of the track are not at the same height, the tracks are worn down on one side which, in the case of heavy loads, leads to considerable wear and to an impairment of the operational safety. In order to counter this, relatively wide double T-beams were selected as the track in this system, although these beams have to be replaced after a certain period of operation due to the small diameter of the top of the double T-beam.

EP 08 34 459 B1 discloses a container transport system with rails on tracks, linear motors and rotatable wheels with a system of tracks that are arranged crosswise, at right angles and parallel to each other, forming intersections, whereby the rails are only arranged outside of the intersections. The transporter trolley has wheels that can rotate around a pivot and that have horizontal guide rollers, whereby the spacing of the wheels corresponds to the spacing of the rails, and the wheels with the guide rollers can turn in the intersections. Magnets arranged on the transporter trolley in the lengthwise and crosswise directions move the transporter trolleys in the lengthwise and crosswise directions by means of stators as well as a linkage with an articulated lever, with a pushing carriage for turning the wheels with horizontal guide rollers, which is characterized in that the wheels on the transporter trolley are configured as double disk wheels. This system likewise has the drawback that the wheels are rigidly connected to the transporter trolley. The wheels consist essentially of three parts, whereby the middle part of the wheels travels on the rail, and guide rollers on both sides ensure that they are guided along the rail. However, rails are only arranged outside of the intersections, whereby only a limited part of the wheel surface travels on the rail. However, no continuous rail is present in the intersections since the double wheels in the embodied form have to turn on flat surfaces that are formed by plates. A drawback of the rail system is that no continuous rail is present but rather that, in the intersections, flat surfaces have to be present, which leads to differing wear between the rails and the turning surfaces, so that after a certain period of operation, the running surfaces or rails have to be reworked so that no joints between the intersection and the rail lead to wear of the system. Furthermore, the transporter trolleys cannot be braked with point precision.

DE 198 08 555 C1 describes a buffer for rail vehicles in which the rail vehicle is braked by a front plate on a damping rod, whereby the damping rod absorbs the impact forces. The buffer can be folded down, although only in the direction of the vehicle so that the vehicle has to be moved back with respect to the buffer. The buffer seems to be suitable for vehicles that have to be braked at a high speed, which is why a damping means is present. This device is unsuitable for vehicles that are traveling at a low speed and that have to be stopped, after which they continue to travel.

SUMMARY OF THE INVENTION

An object of the present invention is to provide a transport system with which the wheels travel uniformly between the intersections and the flat traveling surfaces, and no additional forces occur between the wheels and the transporter trolley when the two tracks have slight differences in height, and the transporter trolley can be braked with point precision at a low speed and high weight, after which the possibility exists for the transporter trolley to continue to travel on the rail.

The present invention provides a rail-mounted transport system for containers and interchangeable bodies with linear motors and swiveling wheels, which is characterized in that the wheels travel on a network of rails that are arranged at a crosswise angle and parallel with respect to each other and that have continuous flat travel surfaces and form intersections, whereby outside of the intersections, a guide profile arranged in the middle runs on one rail parallel to the other rail. Moreover, the transporter trolley is provided with a pivot and swiveling wheels with horizontal guide rollers, whereby the spacing of the wheels corresponds to the spacing of the rails for lengthwise and crosswise travel, and the wheels with the guide rollers can be swiveled in the intersection. Magnets arranged on the transporter trolley in the lengthwise and crosswise directions move the transporter trolleys in the lengthwise and crosswise directions by means of stators of the tracks. An encircling multi-part linkage with two pushing carriages running in opposite directions serves to simultaneously turn all of the wheels and horizontal guide rollers in the intersections. Since the intersections are very small due to the small width of the rails, the transporter trolley should be affixed precisely in the intersections so as not to move there. This is ensured according to the invention by bolts on the transporter trolley, which engage in a fixation part of the track when the wheels are swiveled. During the swiveling operation of the wheels in the intersection, the transporter trolley is locked in fixation points by means of two housings mounted on the transporter trolley with spring-loaded bolts and by means of a two-stage control bar of the transporter trolley. After the swiveling operation has been completed, the bolt is unlocked again, for example, for the crosswise travel.

Moreover, the wheels and the guide rollers may be supported in a two-part wheel housing, whereby the pivot bearing and the guide roller are supported in the outer wheel housing, while the double wheels are supported in the inner wheel housing. The inner wheel housing and the outer wheel housing are connected by means of a low-lying bushing/bolt bearing arranged in the direction of travel. This ensures that a uniform load is applied onto the double wheels, even if the track surface is slanted.

Moreover, there is a limiting element to secure and stop transporter trolleys and/or vehicles, whereby the stop lever of said limiting element acts against the vehicle that is to be secured and stopped, and it folds down in the direction of travel.

It is advantageous for the wheels on the transporter trolley to be configured as double wheels.

Furthermore, it is advantageous to arrange two stators for executing the linkage movement with the pushing carriage parallel to the track.

Moreover, it is advantageous to arrange horizontal guide rollers around only three of four double wheels.

The transporter trolley advantageously consists of an upper trolley and a lower trolley, whereby there are damping elements in order to reduce the positioning impact and locking bows to prevent the unintentional separation of the upper trolley and the lower trolley. The two-part transporter trolley also has the advantage that deformations in the upper trolley due to varying transport loads are only transmitted to a slight extent to the lower trolley, so that a constant air gap is formed between the stator and the trolley magnet, which enhances the drive performance.

It is also advantageous for container corner fittings to be installed on the upper trolley at a distance of one container in order to transport the transporter trolley. This makes it possible to lift the transporter trolley with a lifting device, for example, with a container spreader.

The transporter trolleys are to be configured in such a way that they travel without their own energy or energy supply and without their own intelligence. It is advantageous to lay the rails on sleepers in the intersection area as well. In this manner, even if the substrate is not very firm, as is often the case in storage facilities, it is ensured that both sides of the track are at exactly the same height. The parking positions of the transporter trolley are advantageously provided with tiltable and traversable limiting elements. These are to be configured in such a way that, owing to the tiltable support lever, the frame forces that occur are immediately dissipated. The traversable limiting element for securing and stopping the transporter trolleys consists of a double-angled or Z-shaped lever stop that is arranged with a hinge bolt so as to swivel on a pedestal bearing. Here, one surface of the stop lever acts against the vehicle that is to be secured or stopped, whereby the bottom of the stop lever acts against a folding support lever. The support lever, which can be swiveled around an axis, is connected to the stop lever by a connection tab, which is arranged on the support lever underneath the swiveling point and acts on the stop lever likewise underneath the lever that is Z-shaped in the knee. One side of the stop lever, in which a hinge bolt, the bolt for the connection tab and another bolt are arranged, is designated as a swivel lever. Underneath the bolt for the connection tab, there is a bolt for an actuation element which is connected to the swivel lever by an extension rod. The actuation element is connected, on the one hand, to a pedestal bearing so as to swivel and, on the other hand, to the swivel lever so as to swivel. There are springs arranged in the hinge bolts of the stop lever as well as on the hinge bolts of the support lever and said springs, when in the opened state, effectuate the return of the elements. In the closed state, the limiting element acts against the trolley to be braked on the one hand and against a stop that is attached to a baseplate together with another stop and two pedestal bearings on the other hand. In the opened state, the stop lever acts against a pedestal bearing. In order to open the swivel lever, first of all, the support lever is folded back underneath the swivel lever, after which the stop lever remains folded back until the movement is limited by the stop. Then the transport vehicle can traverse the limiting element. As soon as the limiting element has been traversed, the stop lever can be retracted by the actuation element or by the electromagnet of the stop lever until the support lever once again affixes the stop lever.

In another holding means for the parking position, underneath the lengthwise magnet of the transporter trolley, there is a ferritic reaction part that holds the trolley by means of the existing half of the magnet.

Furthermore, it is advantageous for four horizontal guide rollers to be arranged on the wheel housing, in each case around one pair of double wheels. Sensors for controlling the stators and for measuring the displacement are to be arranged between the tracks so as to provide full surface coverage. Moreover, it is practical to arrange the sensors in such a way that there is always a sensor underneath the transporter trolley. The tracks are configured as modular building block systems and thus can be expanded and supplemented. It is advantageous for the width of the transporter trolley to be dimensioned such that the containers can be transferred directly from straddle carrier vehicles. The rail-mounted transport system according to the invention for containers and interchangeable bodies has the advantage that continuous rails are also arranged in intersections on which the wheels of the transporter trolley can be swiveled, whereby two-part wheel housings ensure that a uniform load is exerted onto the double wheels, even if the track surface is slanted.

BRIEF DESCRIPTION OF THE DRAWINGS

Below, the invention will be explained in greater depth with reference to an embodiment and drawings, in which.

DETAILED DESCRIPTION

Figure 1:
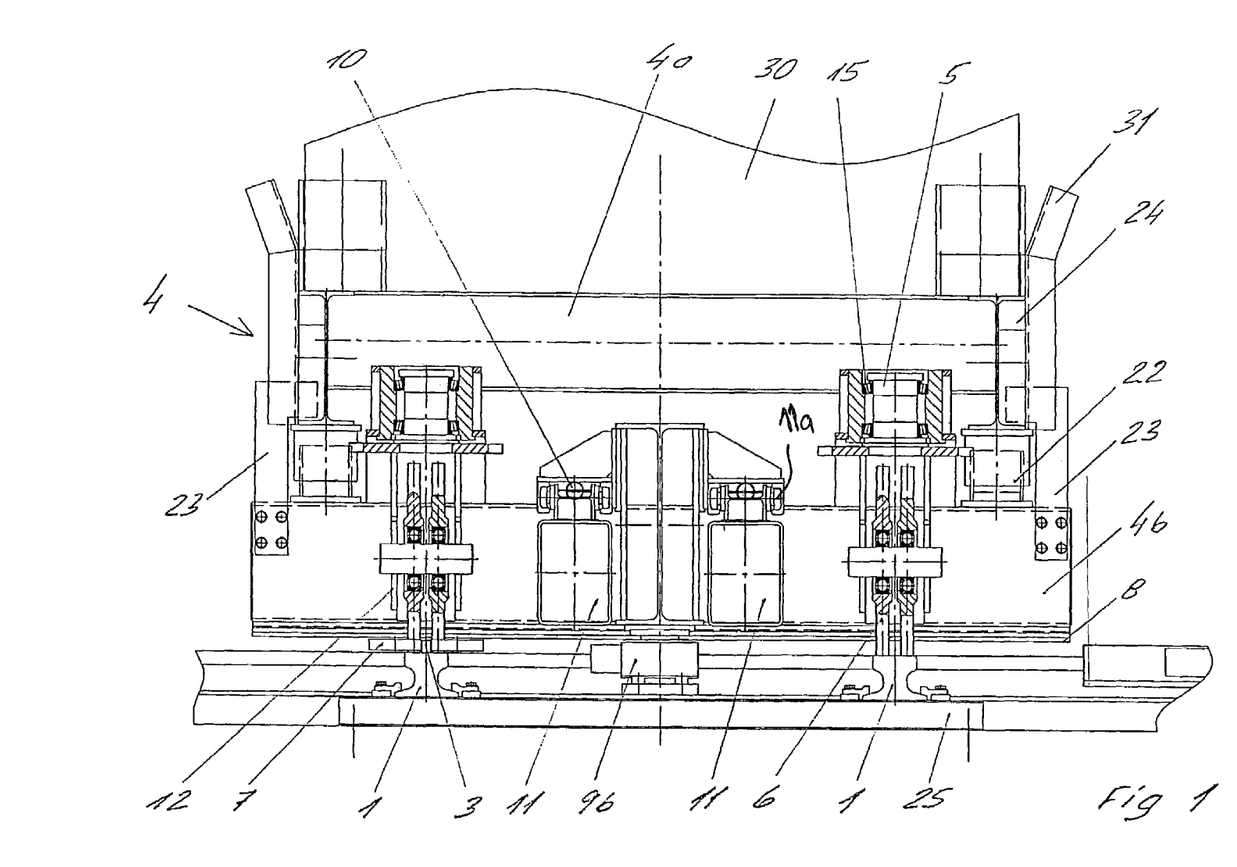
FIG. 1 shows a section through a rail-mounted transport system at the level of the main stators.

FIG. 1 shows a transporter trolley 4 consisting of the upper trolley 4a and the lower trolley 4b, which are connected to each other by means of damping elements 22. Separation of the upper trolley 4a and the lower trolley 4b is prevented by the locking bow 23. The upper trolley has corner fittings 24 that serve to lift the transporter trolley. The transporter trolley 4 travels on rails 1 that are laid on sleepers 25. Between the rails, there are main stators 9b on the lower trolley 4b and across from the stators 9b, there are pushing carriages 11 which, guided by rollers 11a, move the swiveling linkage. There are magnets 8 on the bottom of the lower trolley 4b. The transporter trolley 4 travels with swiveling wheels 6 on the rails 1, whereby the wheels 6 are guided by guide rollers 7 on a guide profile 3. The guide profile 3 is arranged on only one of the two rails 1, since this is sufficient to guide the transporter trolley 4. The wheels 6 are arranged in a wheel housing 12. The wheel housing 12 is turned at the pivot 5 that is connected to the transporter trolley 4 by means of a pivot bearing 15.

Figure 2:
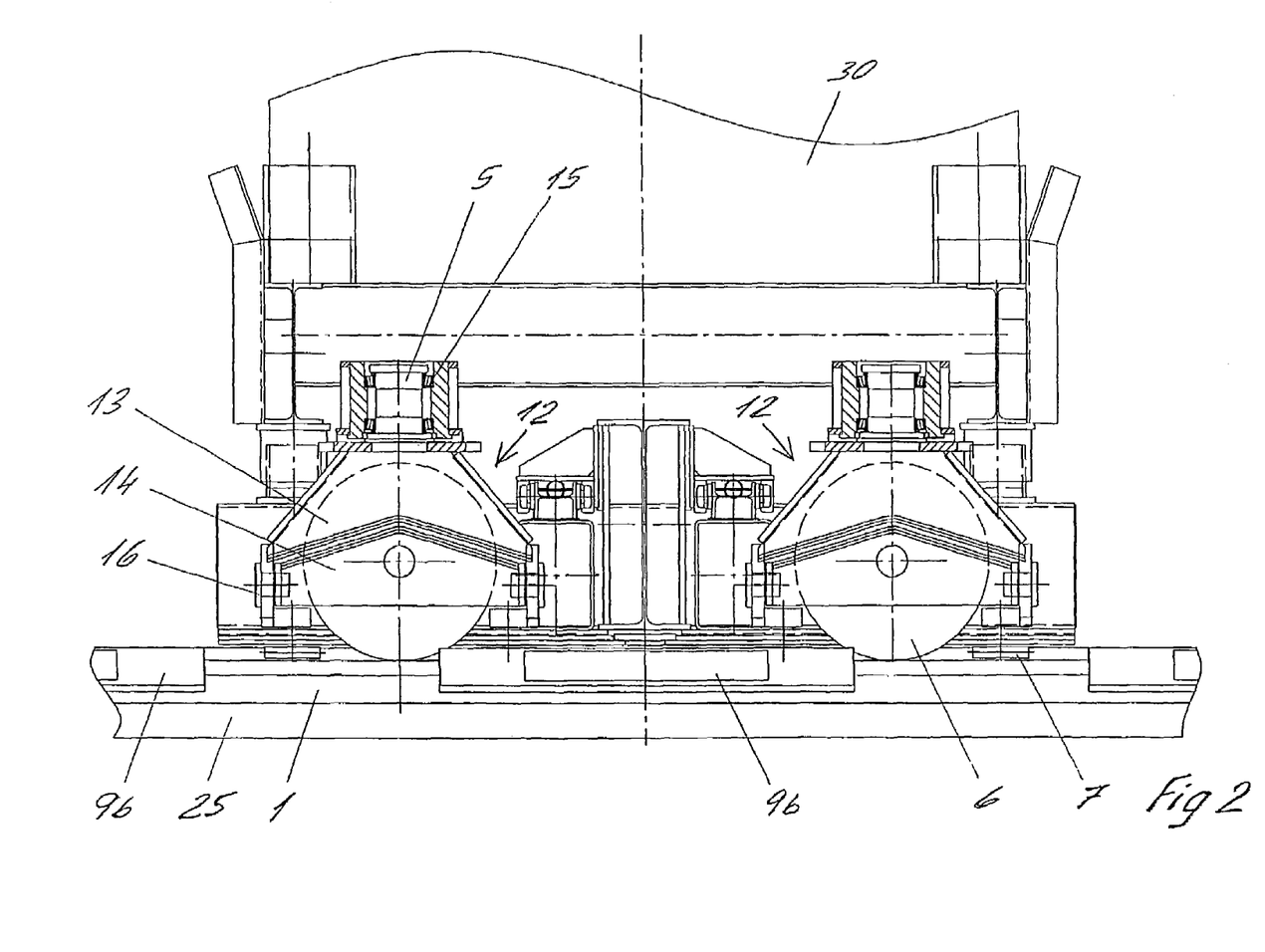
FIG. 2 shows a section through a rail-mounted transport system at the level of the swiveled wheel housings.

FIG. 2 shows the wheel housings 12 in the swiveled position, whereby the outer wheel housing 13 is connected to the inner wheel housing 14 via a bushing/bolt bearing 16. This bushing/bolt bearing 16 is positioned lower than the rotational axle of the wheels 6. Consequently, only a slight deflection is necessary in case of a slanted track. The main stator 9b for the crosswise travel can be seen between the two wheels 6.

Figure 3:
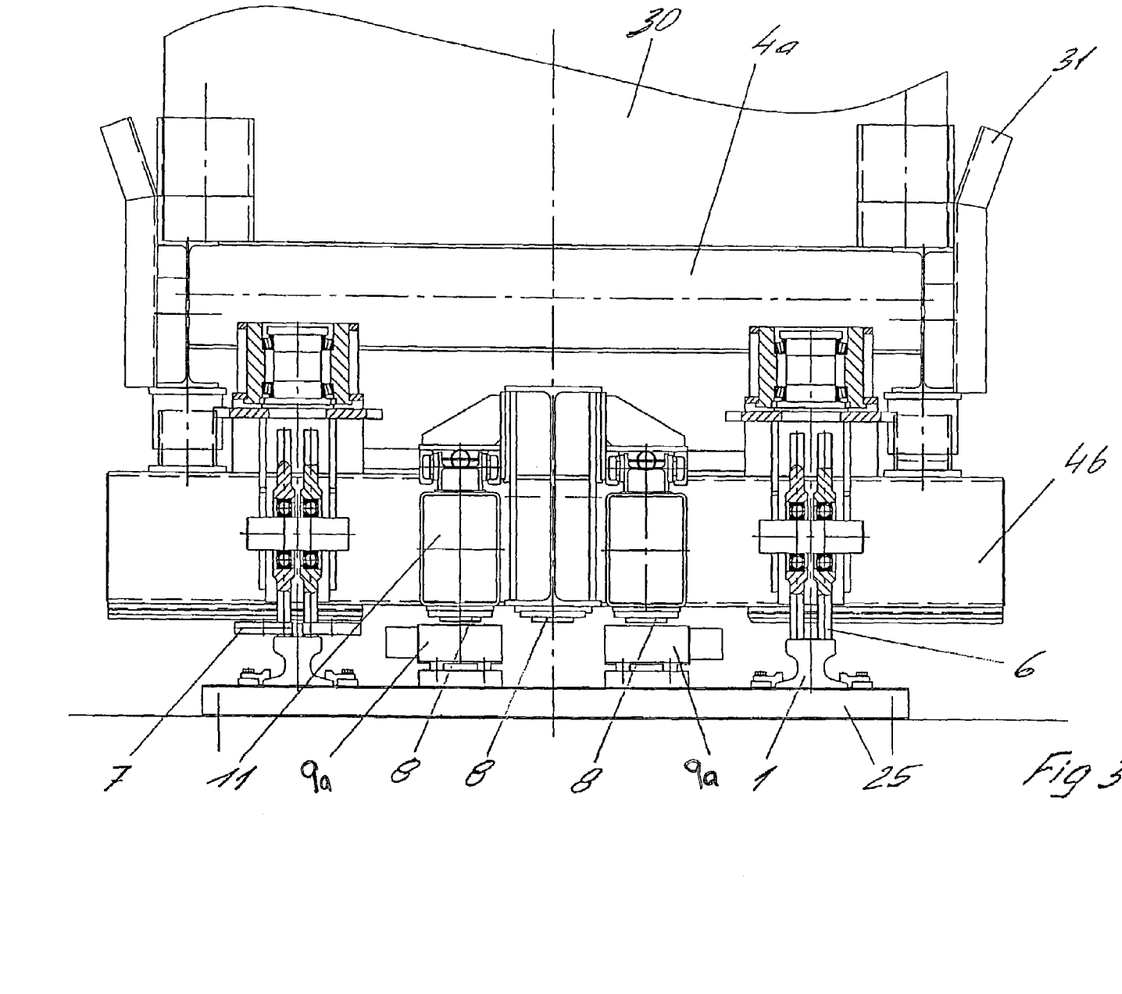
FIG. 3 shows a section through a rail-mounted transport system in the area of the pushing carriages.

FIG. 3 shows a cross section through the transporter trolley 4 consisting of the upper trolley 4a and the lower trolley 4b in the area of the pushing carriages 11 under which magnets 8 are arranged across from the stators 9a.

Figure 4:
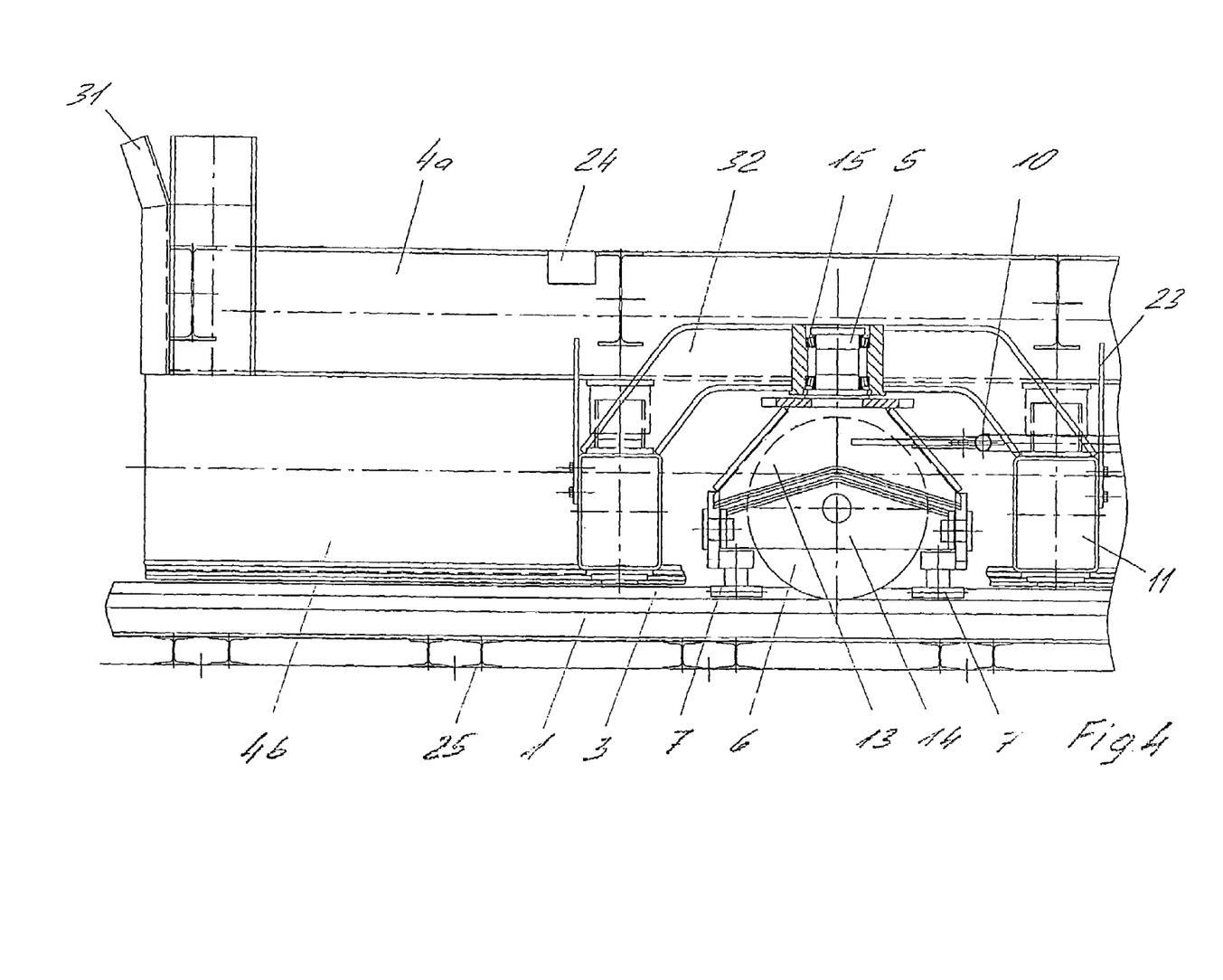
FIG. 4 shows a side view of a rail-mounted transport system with corner fittings.

FIG. 4 shows positioning ramps 31 for the containers that are arranged on the upper trolley 4a as well as corner fittings 24 for transporting the transporter trolley 4. FIG. 4 also shows the linkage 10 for moving the wheel housing 12, which includes an outer wheel housing 13 on which the guide rolls 7 are arranged that guide the wheel along the guide profile 3 and which consists of the inner wheel housing part 14.

Figure 5:
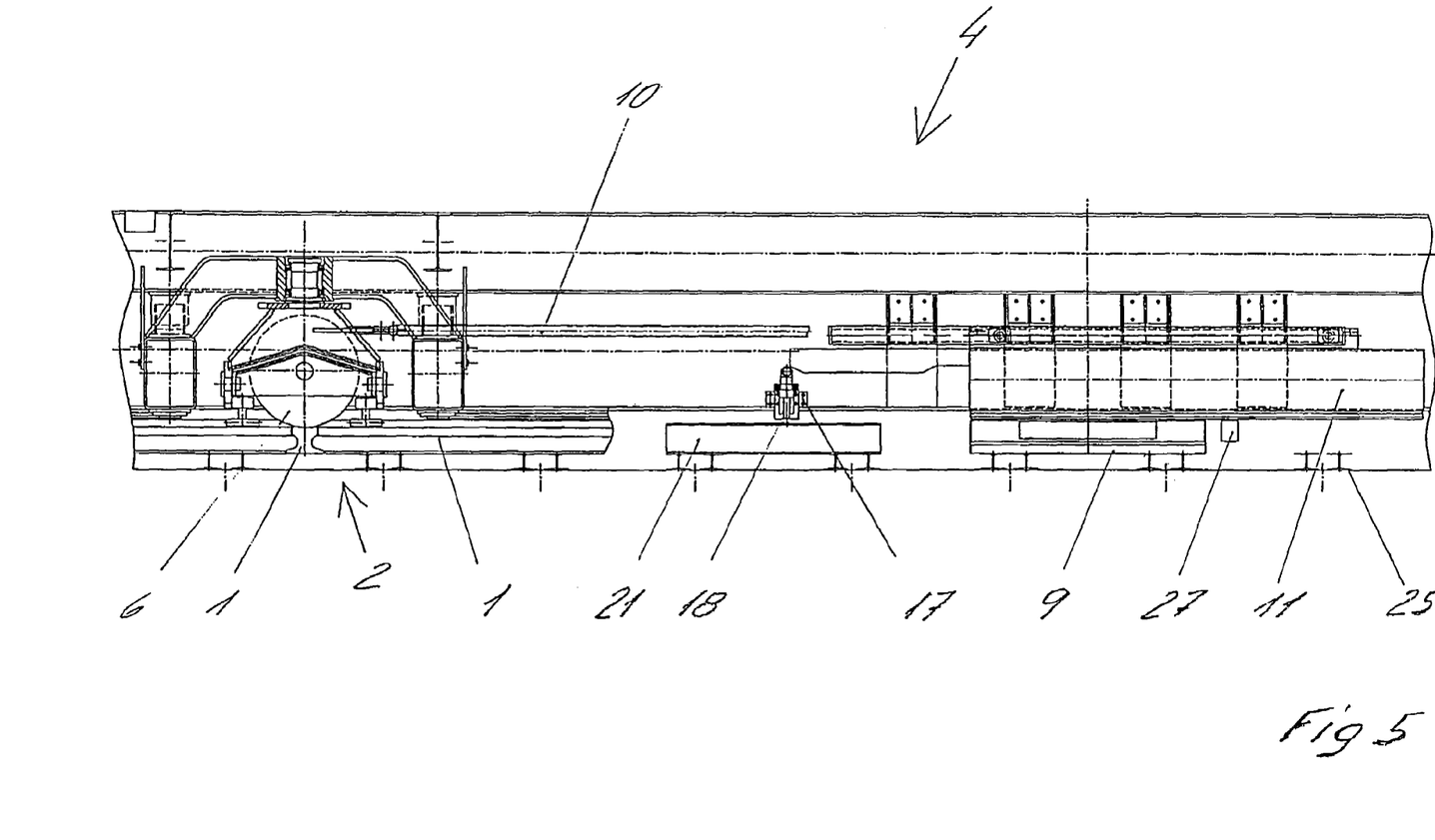
FIG. 5 shows a rail-mounted transport system with a depiction of the bolts and fixation element.

FIG. 5 shows the transporter trolley 4 that is standing with its wheels 6 on an intersection 2 so that the bolt 18 with its housing 17 engages in the fixation part 21 on the transporter trolley 4. Underneath the transporter trolley 4, there is a sensor 27 in the area of the pushing carriage 11, whereby the pushing carriage 11 is positioned above the magnet 8.

Figure 6:
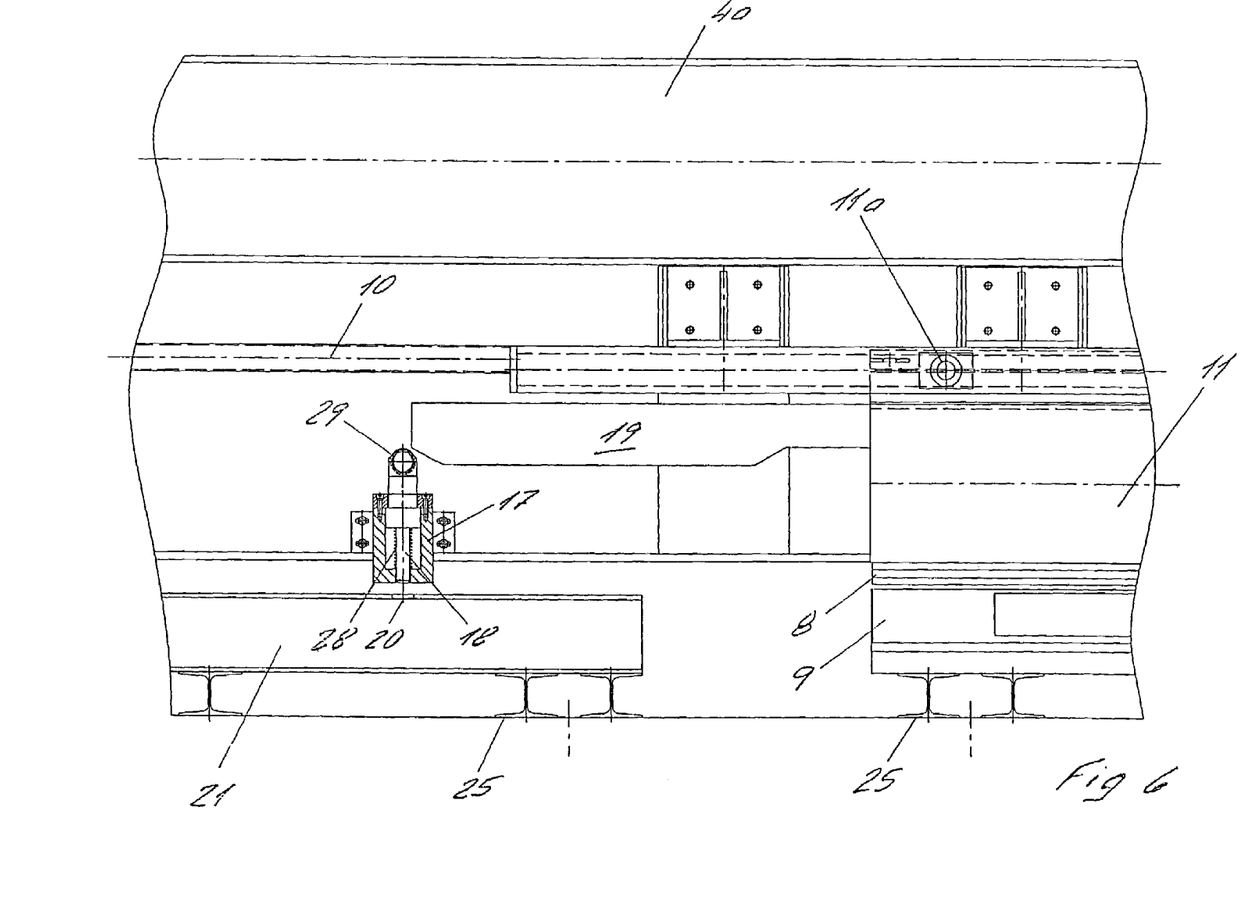
FIG. 6 shows a detailed view of the bolts and fixation element.

FIG. 6 is an enlargement of a detail of FIG. 5, whereby this figure shows that the linkage 10 is supported on the pushing carriages 11 in the area of the bearing rollers 11a and, via a roller 29, a two-stage control bar 19 ensures that the bolt 18 latches in the fixation point 20 of the fixation part 21. This fixation point 20 can be a hole whose size is dimensioned such that the bolt 18 can latch there securely. The bolt 18 with a return spring is arranged movably in its housing 17 so that the bolt 18 is automatically moved upwards into one of the two final positions of the control bar 19. The magnet 8 and the stator 9 are across from each other in the right-hand part of the figure.

Figure 7:
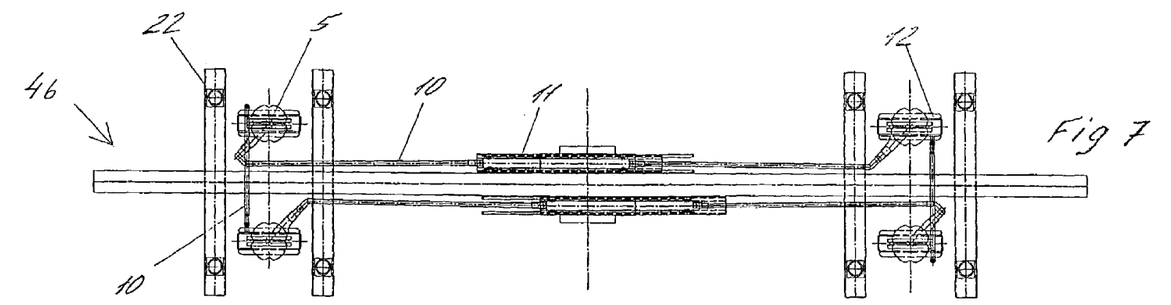
FIG. 7 shows a depiction of the swiveling linkage and of the wheels in the lengthwise travel position.
Figure 8:
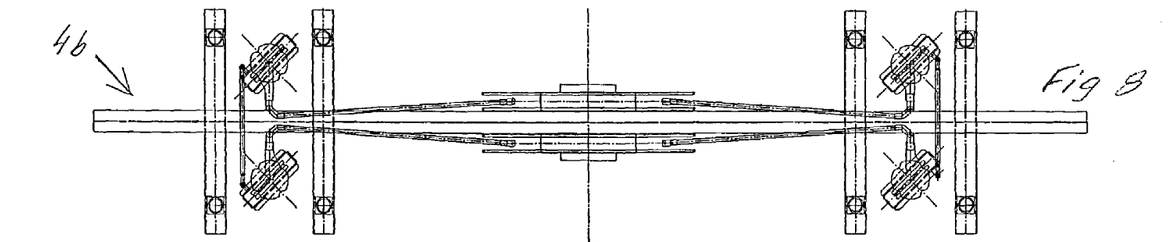
FIG. 8 shows a depiction of the swiveling linkage and of the wheels in a 45° position.
Figure 9:
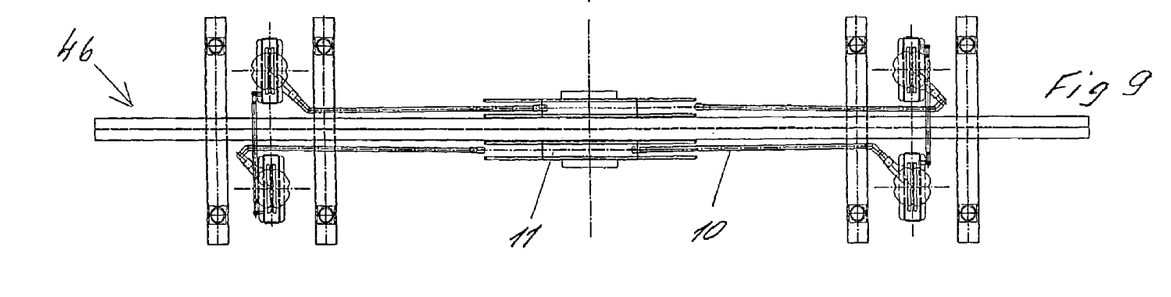
FIG. 9 shows a depiction of the swiveling linkage and of the wheels in the crosswise travel position.

FIGS. 7 to 9 show the pushing carriages 11 with the linkage 10 and the wheel housing 12 for the wheels 6 in different positions, with the lower trolley 4b, namely, FIG. 7: lengthwise travel, FIG. 8: swiveled into a 45° position, and FIG. 9: crosswise travel. All three figures show that all of the wheels 6 are connected to each other by the linkage 10, as a result of which they can be swiveled simultaneously.

Figure 10:
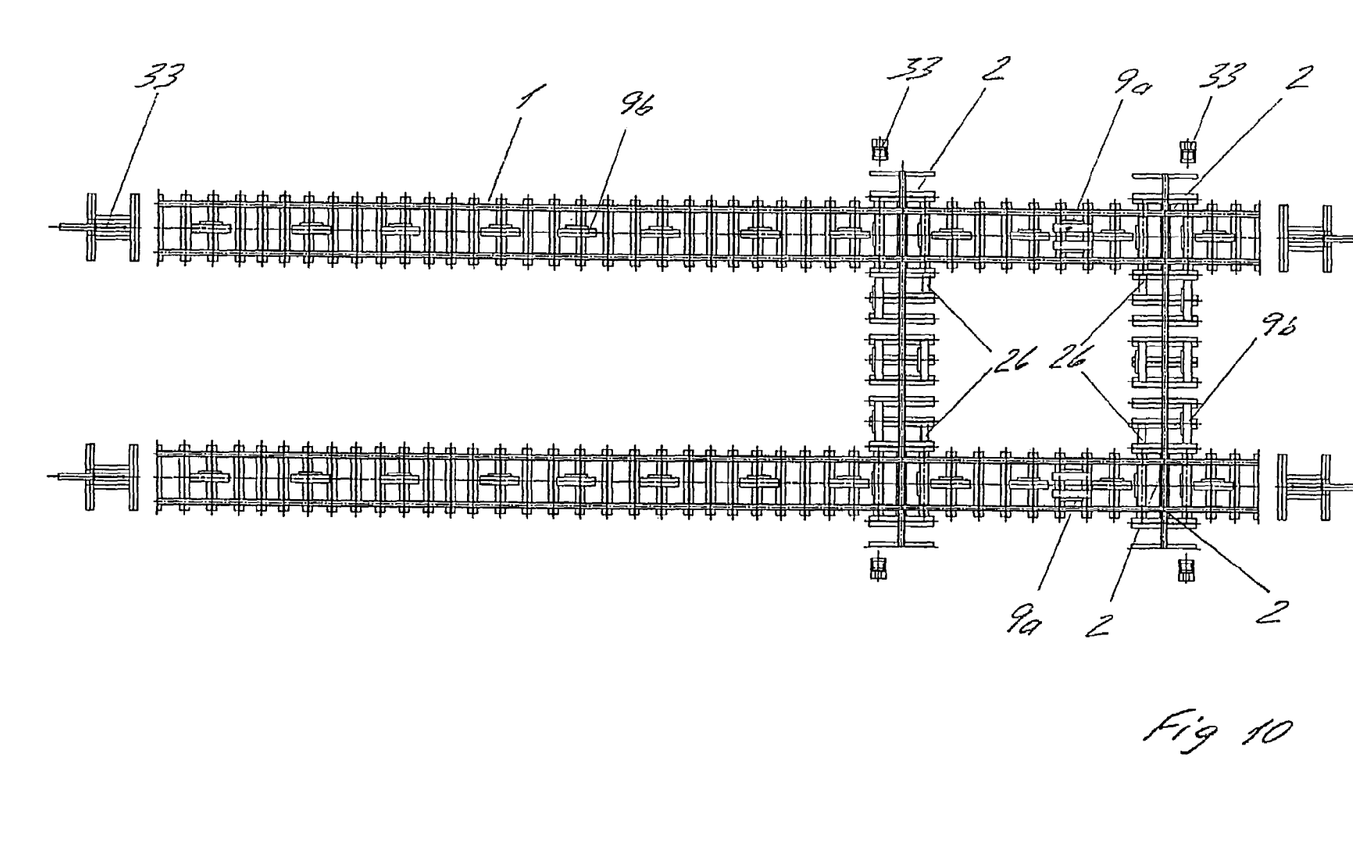
FIG. 10 shows a depiction of the rail system with stators and limiting elements.

FIG. 10 shows parallel rails 1 on sleepers 25 between which there are main stators 9b, whereby adjacent to the intersections 2, there are two limiting elements 26 and buffers 33 with which the transporter trolleys 4 are affixed at the end of the rails 1 and at the edge of the intersections 2. A traversable limiting element 26, which acts against the trolley buffer 34 of the lower trolley 4b, which can be seen in FIG. 11. Securing the trolley 4b against lateral shifting due to wind forces or the like, as shown in FIG. 12, can also be achieved by the force lines of the magnetic field between the ferritic substructure 36 and the lower trolley 4b.

Figure 11:
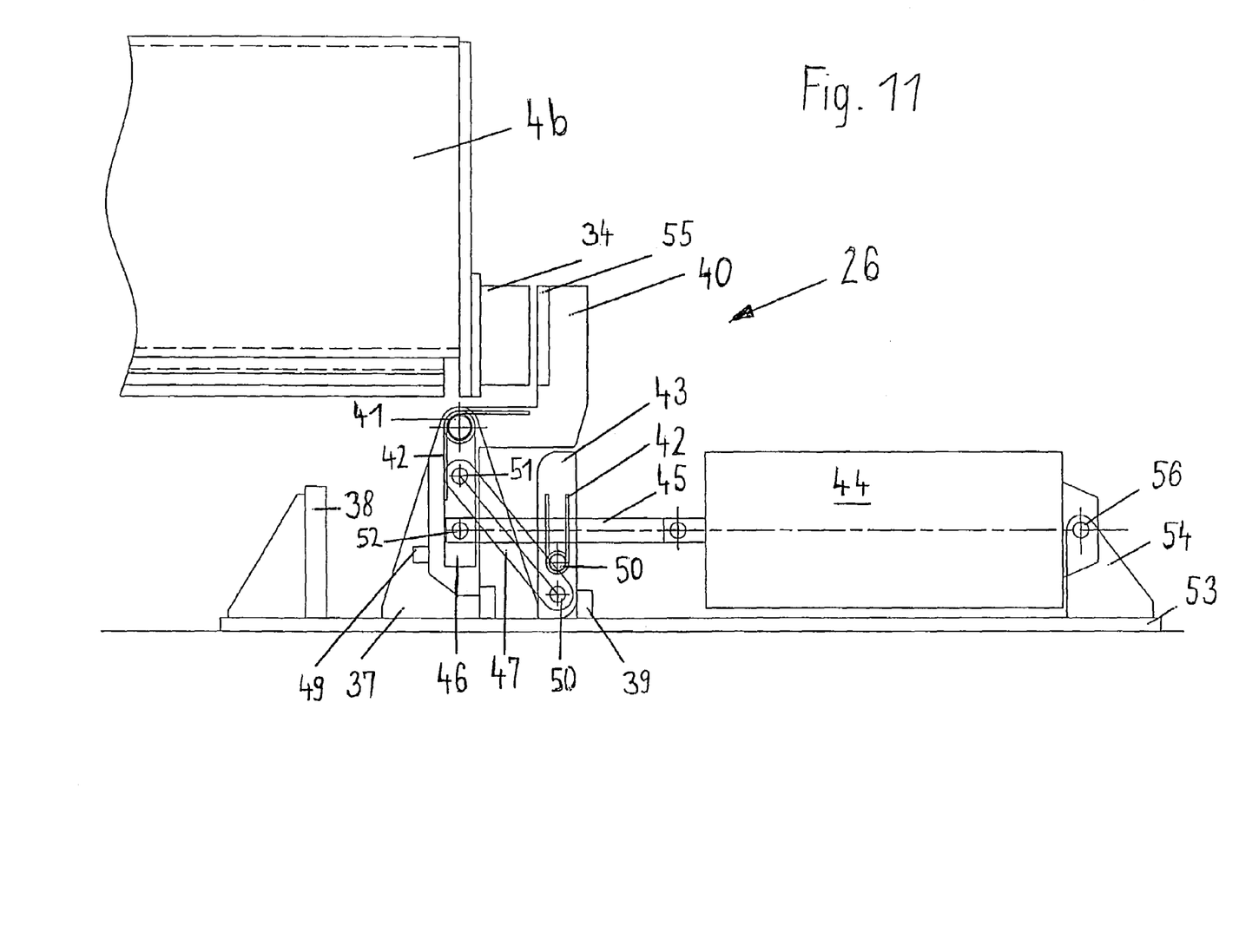
FIG. 11 shows a side view of a traversable limiting element in the closed state.
Figure 12:
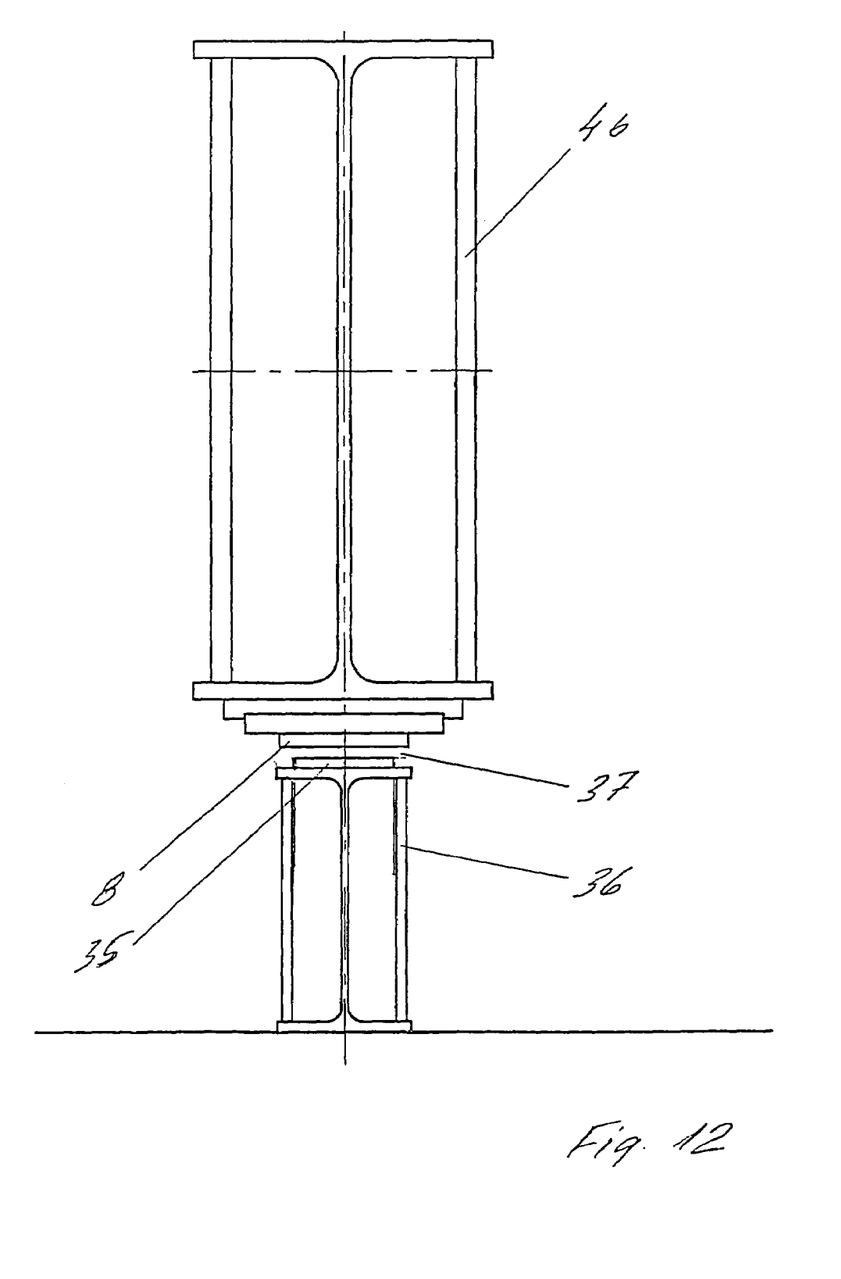
FIG. 12 shows a cross section of the lower trolley above the ferritic substructure.

FIG. 11 shows a vehicle 4b with a trolley buffer 34 that has struck against the surface 55 of a stop lever 40 and that cannot travel any further in the direction of the stop 40, whereby the stop lever 40 acts against a support lever 43 that can rotate around an axis 50, whereas the stop lever 40 can swivel around the hinge bolt 41. The hinge bolt 41 is attached to the pedestal bearing 37 which is connected to the baseplate 53. Likewise attached to the baseplate 53 are the stop 38, the limiting parts 39 as well as the pedestal bearing 54 on whose axis 56 the actuation element 44—in the present case an electromagnet—is attached. An extension rod 45 leads from the electromagnet to the bolt 52 on the swivel lever 46. By means of this magnet, the swivel lever 46 can be swiveled so that the stop lever 40 can be tilted away. The spring 42 on the hinge bolt 51 causes the stop lever 40 in the unloaded state to always be on the top.

Figure 13:
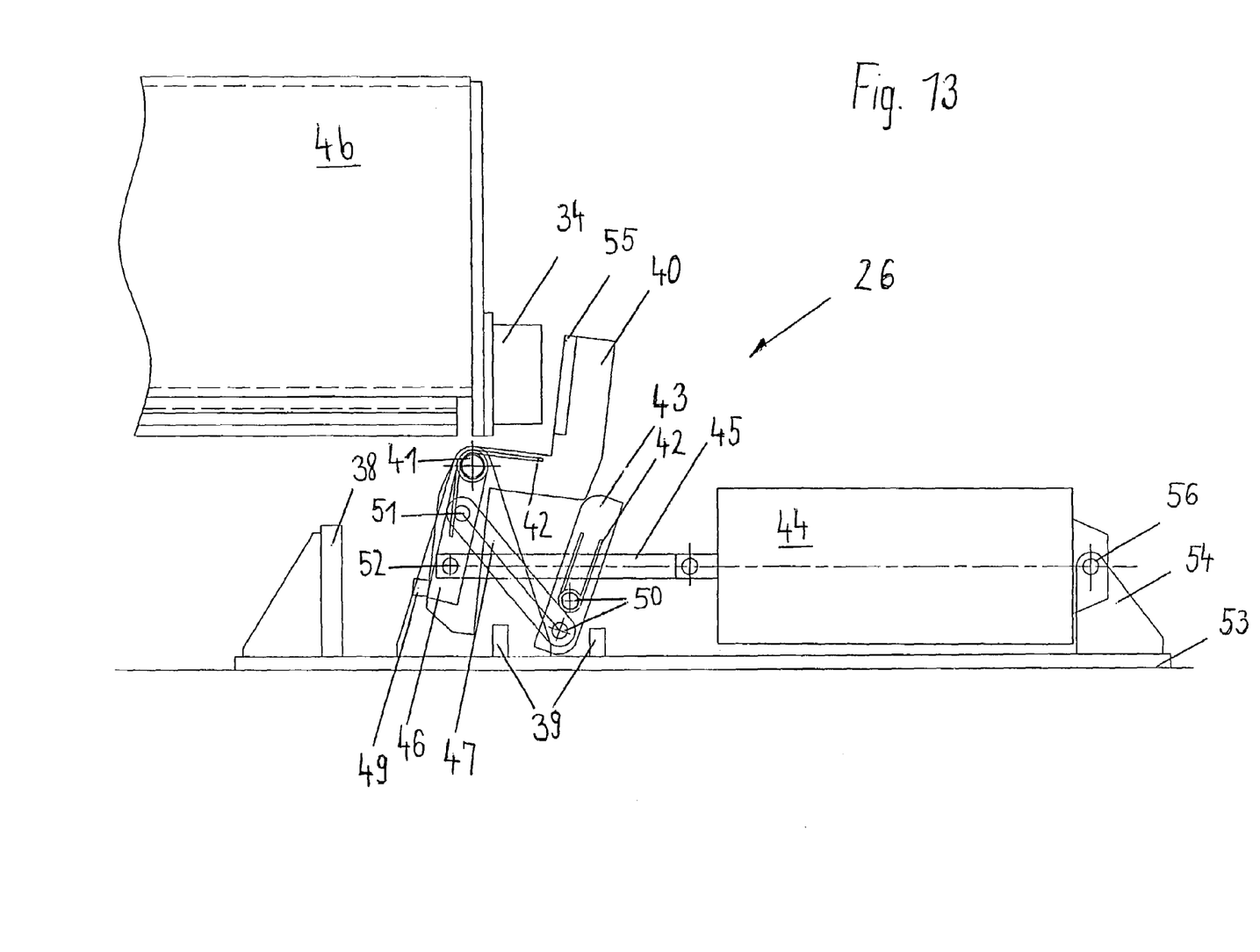
FIG. 13 shows a traversable limiting element in the same view during the opening procedure.

FIG. 13 shows the tilting procedure of the stop lever 40 in which, by means of the electromagnet 44, the extension rod 45 is extended in the direction of the swivel lever 46 until the swivel lever 46 strikes against the limiting part 49, as a result of which the swivel lever 46, which is attached to the hinge bolt 41, actuates the connection tab 47, so that the support lever 43 is pulled out from under the stop lever 40, after which the stop lever 40 is swiveled around the hinge bolt 41 until it moves against the stop 38. In this process, the electromagnet 44 is swiveled around the axis 56. The movement of the support lever 43 is limited by the limiting part 39. There are springs 42 situated on the support lever 43 as well as on the stop lever 40. Once the stop lever 40 has reached its end position, which can be seen in FIG. 14, it frees the path for the vehicle 4b and can be traversed by the latter. After the traversing, the path can be blocked once again in that the electromagnet 44 reverses the movement sequence by retracting the extension rod 45 so that the stop lever 40 once again blocks the track.

Figure 14:
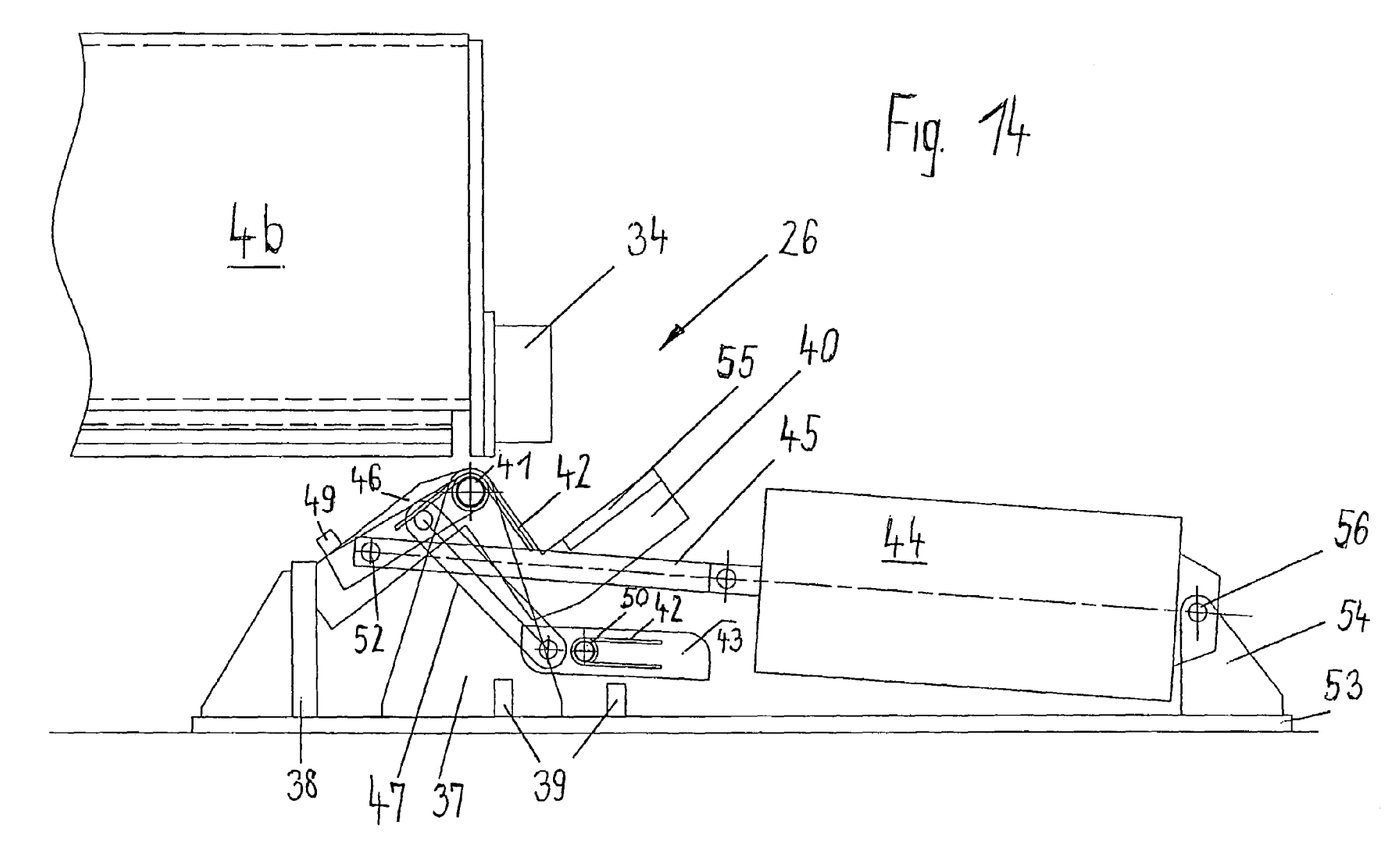
FIG. 14 shows a traversable limiting element in the opened state.

FIG. 14 shows the traversable limiting element 26 in the opened state.

What is claimed is:

1. A rail-mounted transport system drivable by a linear motor, comprising:
    a network including first pair of rails disposed parallel to and at a spread distance from one another and a second pair of rails disposed parallel to and at the spread distance from one another and at an angle with the first pair of rails, the second pair of rails intersecting the first pair of rails so as to form an intersection, wherein each of the rails of at least one of the first and second pair have a flat travel surface passing continuously through the intersection and at least one rail in each of the first pair and second pair includes a respective guide profiles outside of the intersection;
    a two-part transporter trolley including a plurality of wheels spaced apart at the spread distance from each other and swivelable about a pivot, and a plurality of horizontal guide rollers, wherein the plurality of the wheels and the plurality of guide rollers are configured to turn in the intersection so as to enable lengthwise and crosswise travel;
    a plurality of stators disposed at the network;
    a plurality of magnets disposed on the transporter trolley in the lengthwise and crosswise directions and configured to interact with the stators so as to move the transporter trolley in the lengthwise and crosswise directions;
    a plurality of two-part wheel housings, each including an outer wheel housing supporting at least one guide roller and a pivot bearing, and an inner wheel housing supporting at least one wheel, the inner and the outer wheel housings being connected using a low-lying bushing/ bolt bearing positioned in a direction of travel; and
    a limiting element configured to secure and stop the transporter trolley, the limiting element including a stop lever configured to selectively act against the trolley and to fold down in the direction of travel.

2. The rail-mounted transport system as recited in claim 1, wherein the transport system is configured to transport at least one of a container and an interchangeable body.

3. The rail-mounted transport system as recited in claim 1, further comprising an encircling multi-part linkage and two oppositely actuatable pushing carriages configured to simultaneously turn all the plurality of wheels and the plurality of horizontal guide rollers.

4. The rail-mounted transport system as recited in claim 1, further comprising a plurality of bolts configured to engage with a fixation part of the network when the wheels of the transporter trolley are swiveled.

5. The rail-mounted transport system as recited in claim 1, wherein each of the plurality of wheels is configured as a double wheel.

6. The rail-mounted transport system as recited in claim 1, further comprising two stators disposed parallel to the network and configured to actuate the linkage and the pushing carriage.

7. The rail-mounted transport system as recited in claim 1, further comprising a bolt housing disposed on the transporter trolley and including a spring-loaded bolt, wherein the transport trolley includes control bar, and wherein bolt housing, the spring-loaded bolt and the control bar are configured to lock the transporter trolley in a fixation point during a swiveling operation of the wheels at the intersection.

8. The rail-mounted transport system as recited in claim 1, wherein a set of horizontal guide rollers are arranged around three double wheels.

9. The rail-mounted transport system as recited in claim 1, wherein the transporter trolley includes an upper trolley and a lower trolley, a plurality of damping elements disposed between the upper trolley and the lower trolley and configured to reduce a positioning impact, and a plurality of locking bows configured to prevent an unintentional separation of the upper trolley and the lower trolley.

10. The rail-mounted transport system as recited in claim 9, wherein the upper trolley includes corner fittings separated at a distance of one container.

11. The rail-mounted transport system as recited in claim 1, further comprising a plurality of sleepers, and wherein each of the rails are disposed at least one of the plurality of sleepers.

12. The rail-mounted transport system as recited in claim 1, wherein four of the plurality of horizontal guide rollers are arranged on the wheel housing, in each case around three pairs of double wheels.

13. The rail-mounted transport system as recited in claim 1, further comprising a plurality of sensors configured to control the stators and to measure a displacement disposed between the pairs of rails so as to provide full surface coverage.

14. The rail-mounted transport system as recited in claim 12, wherein the sensors are arranged in such a way that there is always a sensor underneath the transporter trolley.

15. The rail-mounted transport system as recited in claim 1, further comprising a plurality of buffers configured to delimit the rails.

16. The rail-mounted transport system as recited in claim 1, further comprising a ferritic substance configured to provide a magnetic field between the ferritic substance and lower trolley so as to aid in securing the transporter trolley against lateral shifting.

17. The rail-mounted transport system as recited in claim 1,
    wherein the stop lever includes a double-angled stop lever disposed with a hinge bolt so as to swivel on a pedestal bearing, wherein a surface of the stop lever acts against the trolley and the bottom portion of the stop lever acts against a folding support lever; and wherein the limiting element also includes:
    an actuation element disposed so as to swivel with the stop lever on the hinge bolt;
    a swivel lever disposed against the actuation element; and
    a connection tab disposed between the swivel lever and the support lever configured to first transmit a movement of the actuation element to the support lever and then to the stop lever via the limiting part.

18. The rail-mounted transport system as recited in claim 17, further comprising a plurality of stops configured to limit the movement of the stop lever and of the support lever.

19. The rail-mounted transport system as recited in claim 17, wherein the actuation element includes an electromagnet.

20. The rail-mounted transport system as recited in claim 18, further comprising a base plate and a pedestal bearing, wherein the pedestal bearing and the plurality of stops are disposed on the base plate, and wherein the actuation element is arranged so as to swivel on the pedestal bearing.

21. The rail-mounted transport system as recited in claim 18, further comprising a first spring disposed on the hinge bolt and a second spring disposed on the support lever.

* * * * *